United States Patent
Lin et al.

(10) Patent No.: US 11,475,455 B2
(45) Date of Patent: Oct. 18, 2022

(54) USER BEHAVIOR-BASED MACHINE LEARNING IN ENTITY ACCOUNT CONFIGURATION

(71) Applicant: ZenPayroll, Inc., San Francisco, CA (US)

(72) Inventors: Kathy Lin, Houston, TX (US); Matthew Castillon, San Francisco, CA (US); Sahil Jolly, San Francisco, CA (US); Elizabeth Lee Scanlon, Burlingame, CA (US); Jeanette Quick, San Francisco, CA (US); Yair Levin, San Anselmo, CA (US); David Tao, San Jose, CA (US); Namrata Jain, San Francisco, CA (US); Chris Shen, Millbrae, CA (US)

(73) Assignee: ZENPAYROLL, INC., San Francisco, CA (US)

( * ) Notice: Subject to any disclaimer, the term of this patent is extended or adjusted under 35 U.S.C. 154(b) by 97 days.

(21) Appl. No.: 17/158,492

(22) Filed: Jan. 26, 2021

(65) Prior Publication Data

US 2022/0237614 A1    Jul. 28, 2022

(51) Int. Cl.
*G06Q 20/40* (2012.01)
*G06Q 20/02* (2012.01)
(Continued)

(52) U.S. Cl.
CPC ............ *G06Q 20/405* (2013.01); *G06N 5/04* (2013.01); *G06N 20/00* (2019.01); *G06Q 20/02* (2013.01);
(Continued)

(58) Field of Classification Search
None
See application file for complete search history.

(56) References Cited

U.S. PATENT DOCUMENTS

| 5,802,499 A * | 9/1998 | Sampson | G06Q 40/02 |
| | | | 705/35 |
| 10,339,608 B1 * | 7/2019 | Haitz | G06Q 40/125 |

(Continued)

OTHER PUBLICATIONS

H. Gonzalez Villasanti, L. F. Giraldo and K. M. Passino, "Feedback Control Engineering for Cooperative Community Development: Tools for Financial Management Advice for Low-Income Individuals," in IEEE Control Systems Magazine, vol. 38, No. 3, pp. 87-101, Jun. 2018, doi: 10.1109/MCS.2018.2810478. (Year: 2018).*

*Primary Examiner* — Gregory S Cunningham, II
(74) *Attorney, Agent, or Firm* — Fenwick & West LLP

(57) ABSTRACT

A flexible advance system allows users to request and receive advances instantly. The flexible advance system facilitates intra-system transfers between a third-party entity and employee accounts at a third-party system by generating and providing funding instructions to the third-party entity. Funding instructions include a funding amount that the flexible advance system predicts using one or more machine-learned models that account for seasonality and time delays. In executing the instructions from the flexible advance system, the third-party entity transfers funds to its entity account with the third-party system based on the funding amount. Once the flexible advance system receives an indication that the third-party entity has executed the instructions, the flexible advance system authorizes users of the flexible advance system to request short-term advances. The flexible advance system processes short-term advances such that corresponding funds are immediately transferred from the entity account of the third-party entity to employee accounts without delay.

11 Claims, 5 Drawing Sheets

(51) Int. Cl.
*G06Q 40/02* (2012.01)
*G06N 20/00* (2019.01)
*G06N 5/04* (2006.01)
*G06Q 40/00* (2012.01)
*G06Q 10/10* (2012.01)

(52) U.S. Cl.
CPC .......... *G06Q 40/02* (2013.01); *G06Q 40/125* (2013.12); *G06Q 10/1053* (2013.01); *G06Q 10/1091* (2013.01)

(56) References Cited

U.S. PATENT DOCUMENTS

| | | | |
|---|---|---|---|
| 11,308,552 B1* | 4/2022 | Boeder | G06Q 20/3672 |
| 2009/0299911 A1* | 12/2009 | Abrahams | G06Q 40/08 |
| | | | 705/36 R |
| 2017/0213280 A1* | 7/2017 | Kaznady | G06N 20/00 |
| 2020/0104911 A1* | 4/2020 | Suvajac | G06N 20/00 |
| 2020/0349641 A1* | 11/2020 | Fidanza | G06N 20/00 |
| 2020/0357056 A1* | 11/2020 | Hails | G06Q 30/0202 |

* cited by examiner

USER BEHAVIOR-BASED MACHINE LEARNING IN ENTITY ACCOUNT CONFIGURATION

BACKGROUND

This description generally relates to a flexible advance system, and specifically to facilitating instant advance opportunities to users of the flexible advance system.

Using current systems, employees are able to request advances for uncompensated time. Employees frequently request advances for uncompensated time because of 1) income volatility and misalignments between income and recurring bills, 2) a lack of savings and access to unearned wages, and 3) a lack of financial planning and budgeting. Further, employees often request advances during times of emergency when immediate access to funds are vital. However, using current systems, there is often a delay between the time an employee requests an advance and the time the employee has access to the corresponding funds. As a result, employees are left with inadequate funds during emergencies and may need to request advances from third-party entities, such as loan sharks and payday lenders, that bind employees to high interest rates and further exacerbate financial instability.

SUMMARY

A flexible advance system allows users who receive compensation through the flexible advance system to instantly receive short-term advances for uncompensated time earned within a time interval. The flexible advance system facilitates intra-system transfers between an entity account of a third-party entity at a third-party system and employee accounts at the third-party system by generating and providing funding instructions to the third-party entity. Funding instructions include a funding amount that the flexible advance system predicts using one or more machine-learned models that account for seasonality data, time delays, user information, account signals, employee status or tenure, or the like. The one or more machine-learned models may be any suitable machine-learned model, including but not limited to regression models, neural networks, decision trees, support vector machines, etc. In addition, the flexible advance system may modify predicted funding amounts using one or more safeguards, including a top-up amount that ensures the entity account is not over-funded and a target minimum balance that protects against overdrafts of the entity account.

In executing the instructions from the flexible advance system, the third-party entity transfers funds to its entity account with the third-party system based on the predicted funding amount. Once the flexible advance system receives an indication that the third-party entity has executed the instructions, the flexible advance system authorizes users of the flexible advance system to request short-term advances. For example, the flexible advance system may enable a user to request funds via a user interface of the flexible advance system. The flexible advance system processes short-term advances such that corresponding funds are immediately transferred from the entity account of the third-party entity to employee accounts without delay.

In an embodiment, the flexible advance system is an online system that accesses seasonality data associated with users of the online system. Users of the flexible advance system are each associated with a user account of a third-party system. In the embodiment, the flexible advance system generates a feature vector based on the seasonality data and applies a machine-learned model to the feature vector. The machine-learned model is configured to generate a prediction of a funding amount for a time interval representing a finite length of time based on the feature vector and may be trained and/or validated on historical data from preceding time intervals. The flexible advance system sends a set of instructions that include the predicted funding amount to a third-party entity that is associated with an entity account of the third-party system and is configured to execute the set of instructions by transferring funds to the entity account of the third-party system in accordance with the instructions. The flexible advance system receives an indication that the third-party entity has executed the instructions and, in response, authorizes interactions by users of the flexible advance system with the third-party system. For example, the flexible advance system may authorize users to request instant advances for uncompensated time during a time interval.

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

System Overview

Figure 1:
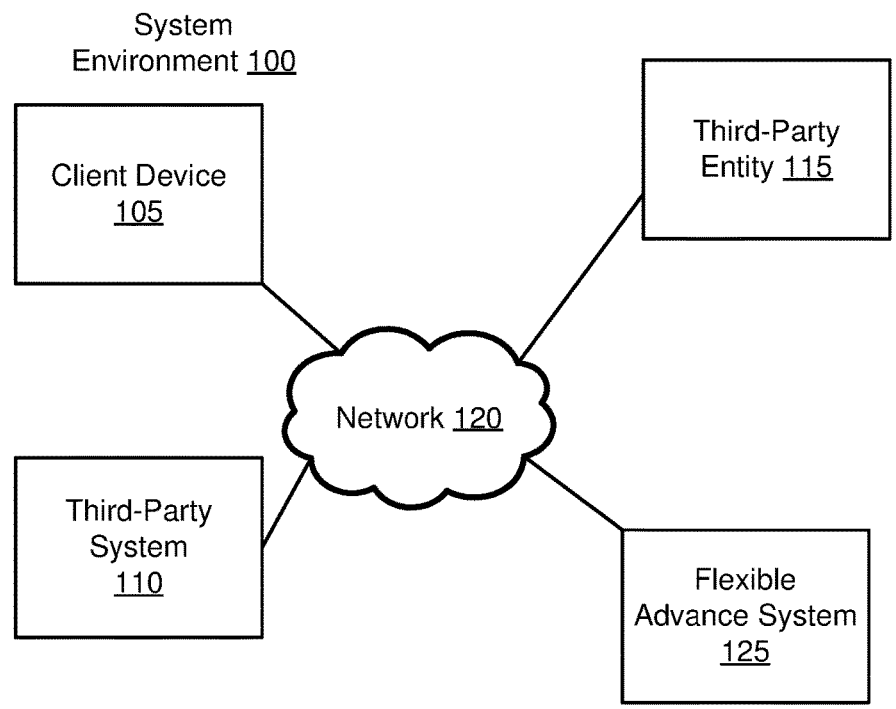
FIG. 1 illustrates a system environment of a flexible advance system, according to one embodiment.

FIG. 1 illustrates a system environment 100 of a flexible advance system 125, according to one embodiment. The system environment 100 shown in FIG. 1 includes a client device 105, a third-party system 110, a third-party entity 115, a network 120, and a flexible advance system 125. In alternative configurations, different and/or additional components may be included in the system environment 100.

A user of the flexible advance system 125 is an individual or entity associated with an organization. Organizations may include schools or universities, businesses, non-profits, government agencies, and the like. Each organization has one or more employees. Employees can use the flexible advance system 125 to request advances for uncompensated time, edit employee information, manage benefits, or the like via a user interface on the client device 105. Employers may also access the flexible advance system 125 through a user interface on a client device 105 to manage employee information, in particular payroll and tax-related information.

The client device 105 is one or more computing devices capable of receiving user input as well as transmitting and/or receiving data via a network 120. In one embodiment, a client device 105 is a conventional computer system, such as a desktop or a laptop computer. Alternatively, a client device 105 may be a device having computer functionality, such as a personal digital assistant (PDA), a mobile telephone, a smartphone, or another suitable device. A client device 105 is configured to communicate via a network 120. In one embodiment, a client device 105 executes an application allowing a user of the client device 105 to interact with the flexible advance system 125. For example, a client device 105 may execute a browser application or native application to enable interaction between the client device 105 and the flexible advance system 125 via a network 120. In another embodiment, a client device 105 interacts with the flexible advance system 125 through an application programming interface (API) running on a native operating system of the client device 105, such as IOS® or ANDROID™.

The network 120 may include any combination of local area and/or wide area networks, using both wired and/or wireless communication systems. In one embodiment, a network 120 uses standard communications technologies and/or protocols. For example, a network may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable techniques.

The third-party system 110 may be associated with an accounting institution, a banking institution, a financial institution, an asset tracking or management institution, or the like. Users have one or more user accounts with the third-party system 110. Through user accounts, users may receive advances from the flexible advance system 125, receive compensation from an employer, and pay a portion of the advance back to the flexible advance system 125 and/or third-party entity 115. In some embodiments, users must have a user account with the third-party system 110 to be eligible to receive advances from the flexible advance system 125. For example, users may be required to receive and/or pay off advances through the third-party system 110.

Additionally, the third-party system 110 has one or more entity accounts that are associated with entities, such as the third-party entity 115. Through entity accounts, entities may instantly transfer funds to a user account upon receiving an advance request from a user of the flexible advance system 125. In addition, entities, such as the third-party entity 115, may recoup advances provided to users of the flexible advance system 125 through entity accounts. For example, the flexible advance system 125 may transfer funds to an entity account based on the short-term advances requested and processed during a time interval, e.g., a predetermined time interval representing a finite length of time.

The flexible advance system 125 manages and provides short-term advances to users of the flexible advance system 125 through the third-party entity 115. The third-party entity 115 may be an accounting institution, a banking institution, a financial institution, an asset tracking or management institution, or the like. The third-party entity 115 is associated with one or more entity accounts of the third-party system 110. In some embodiments, the third-party entity 115 has different entity accounts for different organizations, employers, industries, jurisdictions, and the like. In some embodiments, the third-party entity 115 is a loan originator of the flexible advance system 125.

The third-party entity 115 receives and executes instructions from the flexible advance system 125. Such instructions can include a funding amount that the third-party entity 115 transfers from the third-party entity 115 to its associated entity account at the third-party system 110. The third-party entity 115 may receive and execute instructions at predetermined time intervals. For example, the flexible advance system 125 may provide the third-party entity 115 with instructions daily, weekly, monthly, or the like.

The third-party entity 115 may also execute additional instructions from the flexible advance system 125. Additional instructions may include instructions for distributing funds from an entity account of the third-party system 110 to users upon the flexible advance system 125 receiving and approving short-term advance requests. Additional instructions may also include providing advance data to the flexible advance system 125, such as the frequency of advance requests, the timing of advance requests, amounts requested (e.g., on a user-basis, on an organization-basis, aggregate amounts, etc.), time delays in receiving instructions, time delays in executing instructions, time delays in completing instructions, or the like.

It should be noted that in some embodiments, the entities associated with or responsible for the third-party system 110, the third-party entity 115, users of the flexible advance system 125, and the flexible advance system 125 are different and distinct entities. For instance, the flexible advance system 125 may be independently operated from the third-party entity 115 and the third-party system 110, while still enabling communication between the third-party entity 115 and the third-party system 110.

The flexible advance system 125 provides advances to eligible employees associated with eligible organizations and/or employers. Advances include instant advances provided via intra-system transfers managed by the flexible advance system 125. The flexible advance system 125 manages instant advances by controlling fund transfers between the third-party entity 115 and its corresponding entity account at the third-party system 110. The flexible advance system 125 further manages instant advances by controlling fund transfers between the entity account of the third-party entity 115 and user accounts of users of the flexible advance system 125. In addition, the flexible advance system 125 determines which users of the flexible advance system 125 are eligible for advances, including instant advances.

The flexible advance system 125 controls fund transfers between the third-party entity 115 and its corresponding entity account at the third-party system 110 using funding instructions. The flexible advance system 125 generates funding instructions that include a funding amount, which is the amount of funds the third-party entity 115 is to transfer to its entity account at the third-party system 110. The flexible advance system 125 may generate instructions at predetermined time intervals. For example, the flexible advance system 125 may provide daily instructions, weekly instructions, monthly instructions, seasonal instructions, or the like. The flexible advance system 125 may determine funding amounts using one or more machine learning models that predict funding amounts based on seasonality data, user data, organization data, or the like. The one or more machine learning models may be any suitable machine learning model, including but not limited to regression models, neural networks, decision trees, support vector machines, or the like.

In some embodiments, the one or more machine learning models account for a base amount, a top-up amount, and/or a target minimum balance in predicting the funding amount. A base amount is the initial amount of funding the third-party entity 115 must transfer to its entity account for a time interval, discussed in detail below with reference to FIG. 2. The top-up amount mitigates overfunding of the entity account at the third-party system 110, discussed in detail below with reference to FIG. 2. The target minimum balance prevents overdrafts of the entity account, discussed in detail below with reference to FIG. 2. In some embodiments, the flexible advance system 125 uses a machine learning model to predict the base amount, top-up amount, and target minimum balance, separate machine learning models to predict the base amount, top-up amount, and target minimum balance, or a combination thereof.

In some embodiments, the flexible advance system 125 uses one or more machine learning models to predict the base amount and modifies the prediction based on the top-up amount and/or the target minimum balance. Similarly, the flexible advance system 125 may use one or more machine learning models to predict the target minimum balance and modifies the prediction based on the based amount and/or top-up amount. Alternatively, or additionally, the flexible advance system 125 may use one or more machine learning models to predict the top-up amount and modifies the prediction based on the base amount and/or target minimum balance.

The flexible advance system 125 controls fund transfers between the entity account of the third-party entity 115 and user accounts of users of the flexible advance system 125. The flexible advance system 125 may control fund transfers from the entity account to user accounts using advance instructions. Advance instructions may include an amount of funds to transfer from the entity account to user accounts and/or a timeframe for the third-party entity 115 to execute the advance instructions (e.g., upon receiving the request, at a predetermined time interval, at the end of the day, after a predetermined number of requests have been received and/or approved, etc.).

In some embodiments, the flexible advance system 125 authorizes advance requests from users of the flexible advance system 125 based on the eligibility of users and/or employers. The flexible advance system 125 may determine eligibility using onboarding rules. For example, a user's eligibility may be based on the user's employment status, location, age, and history with previous advance requests. Further, the user's eligibility may also be based on the employer's location, number of employees, number of processed payrolls, number of employees, number of late payments, and the like. In addition, the user's eligibility to request instant advances may be based on an amount of funding in the entity account of the third-party entity 115, a volume of advance requested received over a time interval, or the like.

Eligible users may then make advance requests through a user interface of the flexible advance system 125. The flexible advance system 125 processes the advance requests and determines an amount of funds to transfer to requesting users. The flexible advance system 125 may determine the amount of funds to transfer based on the amount of funds the users requested, state and local tax laws, employer provided benefits, usage eligibility of the user, or the like. Usage eligibility of the user may be based on the number of discrepancies between hours worked and reported during previous pay periods, the number of advance requests previously submitted within a period, and the like. The flexible advance system 125 generates and provides advance instructions to the third-party entity 115 that include the amount of funds to transfer to requesting users. The third-party entity 115 transfers funds to the user accounts of the requesting users in accordance with the advance instructions from the entity account of third-party entity 115 at the third-party system 110.

Furthermore, the flexible advance system 125 may control fund transfers from the flexible advance system 125 and/or user accounts to the third-party entity 115 based on various recoupment schemes, during which the flexible advance system 125 recovers the value of the advance from the employee for the third-party entity 115. The flexible advance system 125 manages and distributes the recoupment of an advance by updating the employer's payroll based on the value of the advance and any associated fees. For example, to update the employer's payroll, the flexible advance system 125 may deduct the amount of the advance from the employee's next regularly scheduled paycheck. In some embodiments, the recoupment schemes are user and/or organization specific. For example, in some embodiments, the flexible advance system 125 distributes the recoupment of an advance over more than one paycheck to alleviate an employees' need for cash liquidity.

In some embodiments, the flexible advance system 125 provides the deducted amount of the advance directly to the third-party entity 115 and/or to the entity account of the third-party entity 115 at the third-party system 110. In some embodiments, the flexible advance system 125 recoups the third-party entity 115 at the end of a time interval, such as a pay period. In other embodiments, the flexible advance system 125 may transfer a portion of the funds to the third-party entity 115 at a predetermined frequency, such as daily, weekly, monthly, etc.

Figure 2:
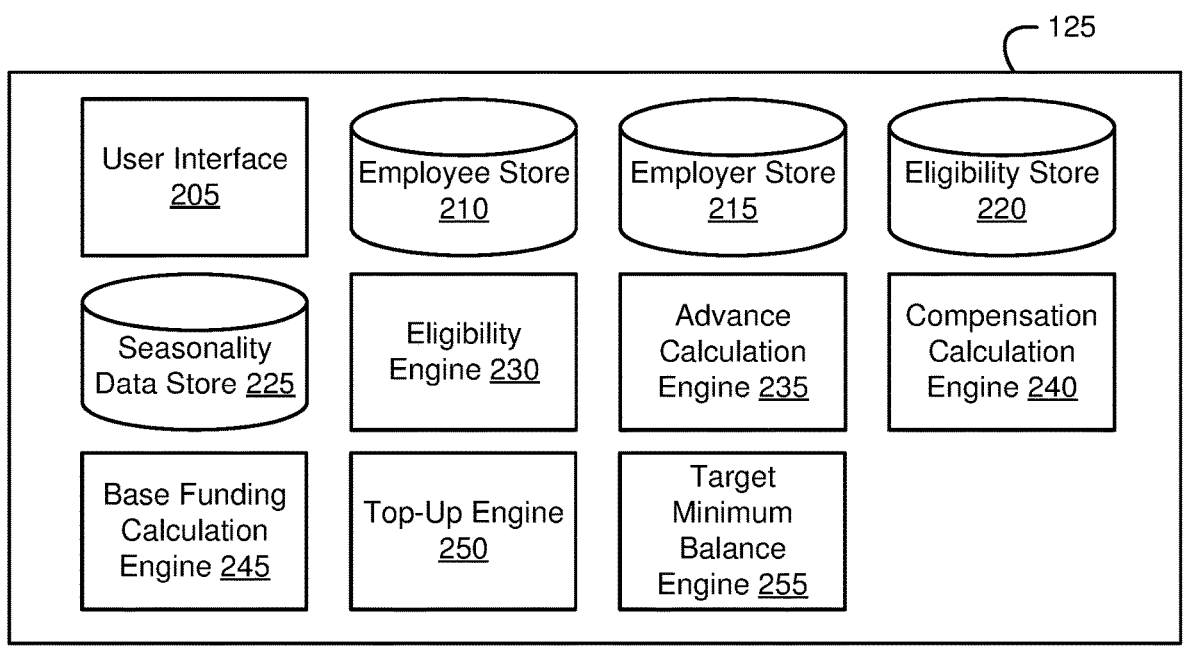
FIG. 2 is a block diagram of an architecture of the flexible advance system, according to one embodiment.

FIG. 2 is a block diagram of an architecture of the flexible advance system 125, according to one embodiment. The flexible advance system 125 shown in FIG. 2 includes a user interface 205, an employee store 210, an employer store 215, an eligibility store 220, a seasonality data store 225, an eligibility engine 230, an advance calculation engine 235, a compensation calculation engine 240, a base funding calculation engine 245, a top-up engine 250, and a target minimum balance engine 255. In other embodiments, the flexible advance system 125 may include additional, fewer, or different components for various applications. Conventional components such as security functions, load balancers, failover servers, management and network operations consoles, and the like are not shown to not obscure the details of the system architecture.

The user interface 205 allows users to interact with the flexible advance system 125. Through various elements of the user interface 205 (such as graphical user interfaces displayed by a client device, communicative interfaces with other components described herein managed by the user interface, and the like), a user can request an advance. Advances include general advances, which are advances resulting from an intersystem transfer between the flexible advance system 125 and a user account of the user. Advances also include instant advances, which are advances resulting from an intra-system transfer between the third-party entity 115 and a user account of the user. User may also input an amount of time worked, input an amount of compensation received during on or more preceding pay periods, determine how much compensation the user is eligible to receive in an advance request, select an advance amount, set up reminders for upcoming advance opportunities or payment reminders, set artificial caps on how much the user can request in future advance requests, and the like through various elements of the user interface 205.

The employee store 210 stores user accounts of employees. Each account has declarative information about an employee that was provided by the employee, the employee's employer, the third-party system 110, or the third-party entity 115. Information may include demographic information, employment history, compensation rates, payment history, employment state, aging balances, payment method (e.g., compensation through check or direct deposit), number of previous advance requests, volume of previous requests, user preferences, and the like. User preferences may include caps set by the user and reminder preferences. Accounts may also be associated with eligibility information that is used by the flexible advance system 125 to determine the onboarding, usage, and/or offboarding (disqualification) eligibility of the user. Employee accounts may be updated and/or modified through the user interface 205 of the flexible advance system 125.

The employer store 215 stores accounts for employers. Information stored in an employer account of the employer store 215 may include employer location, number of payrolls, number of employees, status of employees (active, full-time, part-time, seasonal, inactive, etc.), pay history, number of bank errors, number of late payrolls, ability to run a payroll, ability to let administrators cash out, caps limiting the amount employees can receive in an advance request, and the like. Accounts may also include eligibility information associated with the employer. For example, an account of an employer may include information about the health of the employer (e.g., growth rate, number of employers, termination rates, etc.), employer preferences (e.g., number of payrollers per month), and the volume and/or rate an employer's employees request advances through the flexible advance system 125.

The eligibility store 220 stores rules for the eligibility of employees and employers during onboarding, usage, and offboarding. Onboarding eligibility relates to a set of rules that is used to determine the eligibility of a user to have access to the flexible advance system 125. For example, the set of rules for onboarding eligibility includes rules that are used to determine whether an employee can request advances with the flexible advance system 125. Onboarding eligibility rules may be based on employee work location, status (full-time, active, etc.), compensation, payment method (direct deposit versus check), age, state and local payment advance laws or regulations, and the like. Onboarding eligibility rules may also be based on employer location, number of payrolls, number of late payrolls, number of active employees, number of bank errors, ability to run payroll, type of payroll (e.g., 2-day payroll).

Usage eligibility rules relate to a set of rules used to determine the eligibility of a user during use of the flexible advance system 125. For example, the set of rules for usage eligibility may include rules that are used to determine how much compensation a user can request to receive in an advance request. Usage eligibility rules may be based on the number of reported hours, compensation received in previous pay periods, current balance owed to the flexible advance system 125, minimum advance request (e.g., $75), number of previous advances within a determined period (e.g., within a month, pay period, year, etc.), portion of accrued unpaid compensation, and the like.

Offboarding eligibility rules relates to a set of rules that are used to determine whether an employee and/or employer should be barred from accessing the flexible advance system 125. Rules for employee disqualification may be based on the number of overreported hours, status (e.g., retired, terminated), aging balances, changed payment method (e.g., from direct deposit to check), relocation (e.g., relocation to ineligible state), and the like. Rules for employer disqualification may be based on the location of the employer, number of bank errors, number of late payrolls, employer status (e.g., company suspension), termination rates, state and local payment advance laws and regulations, and the like.

The seasonality data store 225 stores seasonality data, which is data representing periodic fluctuations. The seasonality data store 225 may store pay period seasonality data, business seasonality data, month over month seasonality data, daily seasonality data, weekly seasonality data, quarterly seasonality data, yearly seasonality data, holiday seasonality data, or the like. Seasonality data may be updated automatically at a predetermined frequency, manually by users of the flexible advance system 125, or a combination thereof. The flexible advance system 125 may use the seasonality data when determining a funding amount to be included in funding instructions to the third-party entity 115. The flexible advance system 125 may also use seasonality data when authorizing users to request advances, determining onboarding rules, determining advance amounts, or the like.

The eligibility engine 230 uses the information in the employee store 210, employer store 215, the eligibility rules stored in the eligibility store 220, and/or the seasonality data stored in the seasonality data store 225 to determine the eligibility of a user to use the flexible advance system 125 and/or request an advance. For example, the eligibility engine 230 may determine the eligibility of a user to use the flexible advance system 125 when the user attempts to create a profile with the flexible advance system 125. The eligibility engine 230 may also determine the eligibility of the user every time the user requests an advance. The eligibility engine 230 may also determine the eligibility of users when rules in the eligibility store 220 are updated. Similarly, the eligibility engine 230 may also determine the eligibility of users when employee and/or employer accounts are modified, created, or deleted.

The advance calculation engine 235 calculates an amount of compensation a user is eligible to receive in advance of an upcoming payroll. The amount of compensation the user is eligible to receive in an advance may be based on the history of the user during previous payrolls. For example, the advance calculation engine 235 predicts a net and gross income for the upcoming payroll based on information from previous pay periods. Information may include net and gross income, tax withholdings, liabilities, benefits, deductions, retirements and/or investment caps, Medicare and Social Security withholdings, and the like. For hourly workers, the total amount of compensation may also be based on the number of reported hours. The advance calculation engine 235 may also use user and/or employer behavior when calculating the total amount of compensation. User and/or employer behavior may include hours that were overreported, changes in termination rates of the employer, downward trends in compensation, expected bonuses, and changes in pay rates. Other information, including caps set by the flexible advance system 125 and/or employer, caps set by the employee, state or local laws, a computed risk of lending to the user, and the like, may be also used by the advance calculation engine 235 when calculating the amount of compensation the user is eligible to receive.

The compensation calculation engine 240 determines how an advance will be recouped back to the lender (i.e., the flexible advance system 125 or the third-party entity 115). The compensation calculation engine 240 may also calculate interest rates and/or fees associated with the advance. Once an advance is processed, the compensation calculation engine 240 modifies a corresponding employer's payroll to reflect the recoupment distribution. The compensation calculation engine 240 may recoup the advance amount chronologically against the unpaid days. For example, if an employee is eligible to receive a $500 advance for ten unpaid days, but only requests $250 in advance pay, the $250 will only be recouped against the first five unpaid days (e.g., compensation corresponding to the first five unpaid days will be deducted from the amount allocated for distribution to the employee from the employer's payroll). The employee may then be able to receive an additional advance of $250 before a subsequent payroll.

The compensation calculation engine 240 computes due dates for each loan day (day of advance request) because unpaid days (for which advance compensation is requested) may span multiple pay periods. Because of this, due dates may vary for different loan days within a single advance request. The compensation calculation engine 240 may automatically deduct the total advance amount from the corresponding payrolls of the employee. In other embodiments, the full advance amount is due on a single due date, a repayment plan is instituted, and the like.

The flexible advance system 125 determines a funding amount to include in its instructions to the third-party entity 115 using one or more predictive algorithms and/or machine learning models that estimate an amount of funding required to fulfill the predicted volume of instant advance requests during a subsequent period. The flexible advance system 125 may determine the funding amount based on a base amount, a top-up amount, and/or a target minimum balance that are determined by the base funding calculation engine 245, the top-up engine 250, and the target minimum balance engine 255, respectively. Further, each of the base funding calculation engine 245, the top-up engine 250, or the target minimum balance engine 255 may use the outputs of the other to determine the base amount, top-up amount, and target minimum amount, respectively.

The base funding calculation engine 245 determines base amounts that are used by the flexible advance system 125 to generate funding instructions for the third-party entity 115. A base amount is an initial amount of funding the third-party entity 115 should have in its entity account at the third-party system 110 to fulfill instant advance requests for a specified period. In some embodiments, the base funding calculation engine 245 determines base amounts using historical advance data, such as the number and volume of advances requested during preceding periods, estimated user bases, adoption rates and/or volumes, buffer amounts, seasonality data, user data, or the like. The base funding calculation engine 245 may compute a base amount at predetermined intervals, such as hourly, daily, weekly, monthly, or the like. In some embodiments, the base funding calculation engine 245 may compute a base amount each time the flexible advance system 125 generates funding instructions for the third-party entity 115. Alternatively, or additionally, the base funding calculation engine 245 may compute base amounts independently of when the flexible advance system 125 generates funding instructions. Further, the base funding calculation engine 245 may aggregate one or more computed base amounts that the flexible advance system 125 uses to predict a funding amount. For example, the base funding engine 245 may calculate base amounts hourly that are aggregated into a daily base amount. The flexible advance system 125 may then use the daily base amount in determining a funding amount of a subsequent period.

In some embodiments, the base funding calculation engine 245 uses one or more machine learning models to determine a base amount. Examples of suitable machine learning models include, but are not limited to, regression models, neural networks, support vector machines, principal component analysis, or the like. The one or more machine learning models may generate a prediction of a base amount that the third-party entity 115 will transfer to its corresponding entity account at the third-party system 110. Alternatively, or additionally, the one or more machine learning models generates a confidence interval, such as a 95% confidence interval or 99% confidence interval. In these embodiments, the base funding calculation engine 245 may use an upper bound of the confidence interval as the base amount. Further, the base funding calculation engine 245 may classify a predicted base amount for a subsequent period into categories that are associated with predetermined based amounts and account for seasonality data, organizational data, user data, or the like. For example, the base funding calculation engine 245 may classify a base amount according to the time of year, day of the week, holidays, economic factors, etc. The base funding calculation engine 245 may train and validate the one or more machine learning models using historical data, including previously predicted base amounts for specified periods and seasonality data, and the actual utilization rates and volumes of advance requests for those corresponding periods. In some embodiments, the base funding calculation engine 245 trains and/or maintains separate models for different organizations, employers, industries, jurisdictions, and the like.

An adoption rate is the rate at which users of the flexible advance system 125 request advances and/or the rate at which the flexible advance system 125 predicts users will request advances. Adoption rates may include all advances requested by users of the flexible advance system 125, all instant advances requested by users of the flexible advance system 125, or a combination thereof. In some embodiments, an adoption rate may be a static value, such as a static percentage of users. In other embodiments, adoptions rate may be updated at predetermined intervals. For example, adoption rates may be updated daily, weekly, monthly, before, during or after holidays, or the like. Additionally, or alternatively, adoption rates may be updated based on perceived or actual changes in adoption rates, market changes, user base changes, or the like. For example, the base funding calculation engine 245 may update an adoption rate if the adoption rate changes by a threshold amount. In some embodiments, the base funding calculation engine 245 may determine an adoption rate using an algorithm or machine learning model. The base funding calculation engine 245 may train and validate the algorithm and/or machine learning model using historical data, including previously predicted adoption rates for specified periods and actual adoption rates for those corresponding periods.

A buffer amount is an amount of funding added to the base amount and/or volume estimate to ensure entity accounts are not underfunded. In some embodiments, a buffer amount is a static value, such as a predetermined percentage on top of an estimated base amount. In other embodiments, the buffer amount is computed at predetermined intervals. For example, a buffer amount may be computed each time the flexible advance system 125 generates funding instructions. Alternatively, or additionally, buffer amounts may be adjusted with market changes, changes in adoption volumes and/or rates, changes in user bases, or the like. In some embodiments, the base funding calculation engine 245 determines a buffer amount using an algorithm or machine learning model. The base funding calculation engine 245 may train and validate the algorithm and/or machine learning model using historical data, including previous buffer amounts for specified periods and entity account balances at the end of those corresponding periods.

The top-up engine 250 determines a top-up amount that is used by the flexible advance system 125 to mitigate overfunding entity accounts at the third-party system 110, such as the entity account associated with the third-party entity 115. In some embodiments, the top-up amount is the difference between the remaining, unused balance of an entity account from a preceding period and the predicted funding amount for one or more subsequent periods determined by the flexible advance system 125. In determining a top-up amount, the top-up engine 250 accounts for time delays associated with intersystem transfers between the third-party entity 115 and the third-party system 110. For example, if the flexible advance system 125 provides daily funding instructions to the third-party entity 115 and there is a one day intersystem transfer delay, the top-up engine 250 determines the top-up amount for the following day (day+1) based in part on the remaining, unused balance from the previous day (day−1). Therefore, if 80% of transferred funds were used to fulfill instant advance requests on a Monday, the top-up engine 250 accounts for the remaining 20% of transferred funds in determining a funding amount for the following Wednesday. The top-up engine 250 may also consider additional inputs in determining the funding amount for the following Wednesday, including, but not limited to, a target minimum balance, weekend schedules, one or more algorithms, or the like.

In some embodiments, the top-up engine 250 determines a top-up amount using one or more machine learning models, such as regression models, neural networks, or the like. The one or more models may predict a top-up amount using one or more factors, including but not limited to, remaining, unused balances of one or more preceding periods, seasonality data, user information, adoption rates, outputs from the advance calculation engine 235, compensation calculation engine 240, base funding calculation engine 245, target minimum balance engine 255, or the like. In some embodiments, a machine learning model may be applied to one or more factors to generate a prediction of a top-up amount, a range of top-up amounts, a classification of a top-up amount, or the like, for one or more subsequent periods. In other embodiments, the top-up engine 250 may create a feature vector using one or more factors and apply a machine learning model to the feature vector to generate a prediction of a top-up amount, a range of top-up amounts, a classification of a top-up amount, or the like, for one or more subsequent periods.

In some embodiments, the top-up engine 250 trains and/or validates the one or more machine learning models based on historical data, such as predicted top-up amounts from preceding periods, actual utilization and adoption rates from corresponding periods, seasonality data, user information, or the like. In some embodiments, the top-up engine 250 trains and/or maintains separate models for different organizations, employers, industries, jurisdictions, and the like.

The target minimum balance engine 255 determines target minimum balances that are used by the flexible advance system 125 to ensure entity accounts are not underfunded. A target minimum balance is an amount of funding that serves as a layer of protection against over drafting entity accounts, such as the entity account of the third-party entity 115. In some embodiments, the target minimum balance starts at a predetermined value, such as 1% of an expected origination volume for a period. The period may be any suitable length (e.g., a week, month, quarter, etc.) and may be independent of the frequency with which the flexible advance system 125 provides funding instructions to the third-party entity 115.

The target minimum balance engine 255 updates the target minimum balance for a subsequent period based on the actual utilization rates of the target minimum balance occurring over the period. For example, if a period is a month long, the target minimum balance engine 255 may update the target minimum balance of a subsequent month (e.g., May) based on the daily utilization rates of the target minimum balance over the preceding month-long period (e.g., April). The target minimum balance engine 255 may update the target minimum balance using one or more forecasting models, including regression models, neural networks, support vector machines, or any suitable machine learning model. The target minimum balance engine 255 may update the target minimum balance based on a number of factors, including but not limited to, an initial target minimum balance, utilization rates occurring over the period, origination volumes, adoption rates, seasonality data, user information, or the like. In some embodiments, the target minimum balance engine 255 generates feature vectors based on one or more factors and applies the one or more forecasting models to the feature vectors. In alternative embodiments, the target minimum balance engine 255 applies the one or more forecasting models directly to one or more factors.

The one or more forecasting models may generate a prediction of a modified target minimum balance, a recommended range for a modified target minimum balance, a classification of a predicted target minimum balance, or the like. Additionally, or alternatively, the one or more forecasting models may predict expected utilization rates for the period, expected origination volume for the period, or the like, that may be used by the target minimum balance engine 255 to determine a target minimum balance for a subsequent period. Further, the one or more forecasting models may be trained and/or validated using historical data, including but not limited to, target minimum balances, utilization rates, origination volumes, or seasonality data from previous periods.

In some embodiments, the target minimum balance engine 255 updates the target minimum balance based on the maximum utilization rate(s) occurring over the period. In these embodiments, the target minimum balance engine 255 may adjust the target minimum balance by the maximum utilization rate for the period. For example, if an initial target minimum balance is 1% and the maximum utilization rate of the target minimum balance over a given period is 20%, the target minimum balance engine 255 adjusts the target minimum balance by 20% such that the target minimum balance for the subsequent period is 1.20%. In other embodiments, the target minimum balance engine 255 updates the target minimum balance based any suitable utilization rate, such as an average utilization rate occurring over the period, a median utilization rate occurring over the period, a minimum utilization rate occurring over the period, or the like. In these embodiments, the target minimum balance engine 255 may adjust the target minimum balance by the specified utilization rate and/or update the target minimum balance using one or more trained forecasting models.

Figure 3A:
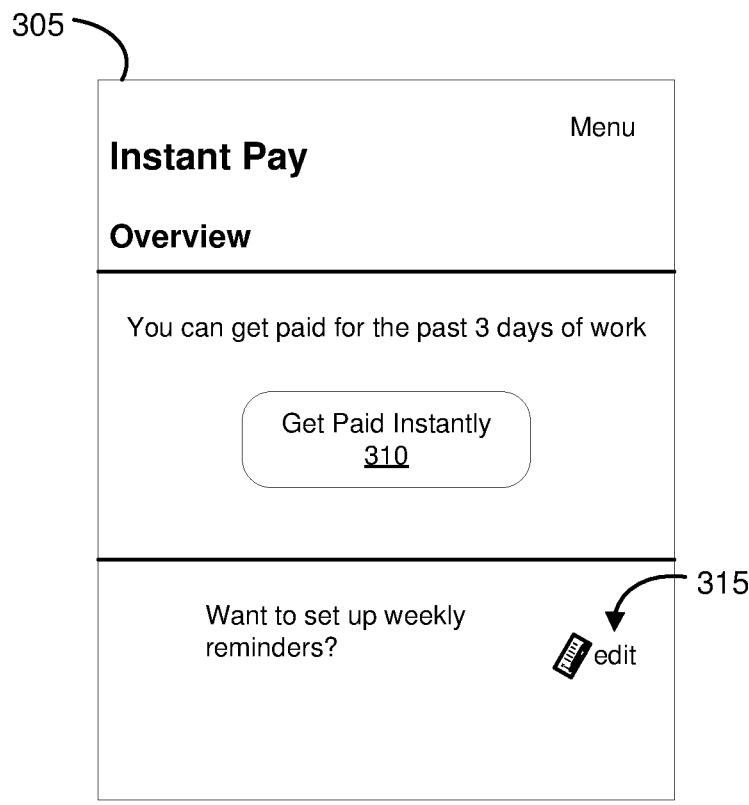
FIGS. 3A-3D illustrate example user interfaces configured to enable receiving and processing an instant advance request, according to one embodiment.

FIGS. 3A-3D illustrate the process of receiving and processing an instant advance request. FIG. 3A illustrates an example instant advance interface 305 of a flexible advance system 125. In the embodiment shown in FIG. 3A, to access an instant advance interface 305, the user must login to a profile associated with the flexible advance system 125. Further, users may be required to access an instant advance interface 305 through a homepage interface in which a user may elect to request a general advance (e.g., an advance from an intersystem transfer between the flexible advance system 125 and a user account of the user) or an instant advance (e.g., an advance from an intra-system transfer between the third-party entity 115 and a user account of the user). Through the instant advance interface 305, the user can initiate an instant advance request, change profile settings, view eligibility, and the like. Information that may be presented to a user in the instant advance interface 305 may include the number of unpaid days for which they can receive compensation, when they can receive the unpaid compensation, profile information (e.g., account identifiers, settings, etc.), and the like.

Users may initiate instant advance requests through an interface element of the instant advance interface 305, e.g., start element 310. Users may also edit profile settings with a profile edit element, e.g., edit element 315. For example, a user may set up notifications to notify the user when they are eligible to initiate an instant advance request, reminders when an instant advance is due, notifications when an account balance is low, etc. Users may also edit the frequency of notifications, reminders based on user preferences and eligibility rules, and set caps on the amount of compensation they can receive in an advance.

In some embodiments, users may only access the instant advance interface 305 if they are eligible for onboarding and instant advances. For example, a user may not be able to create or access an account with the flexible advance system 125 if the user or the user's employer does not meet onboarding eligibility requirements, instant advances are not available in a jurisdiction of the employee or employer, the user has received a threshold number of advances and/or instant advances within a threshold period, or the like. Similarly, in some embodiments, the instant advance interface 305 may only include start element 310 if a user has been authorized to initiate an instant advance request. In some embodiments, the flexible advance system 125 may authorize users to request instant advances based on an amount of funding in the entity account of the third-party entity 115.

Figure 3B:
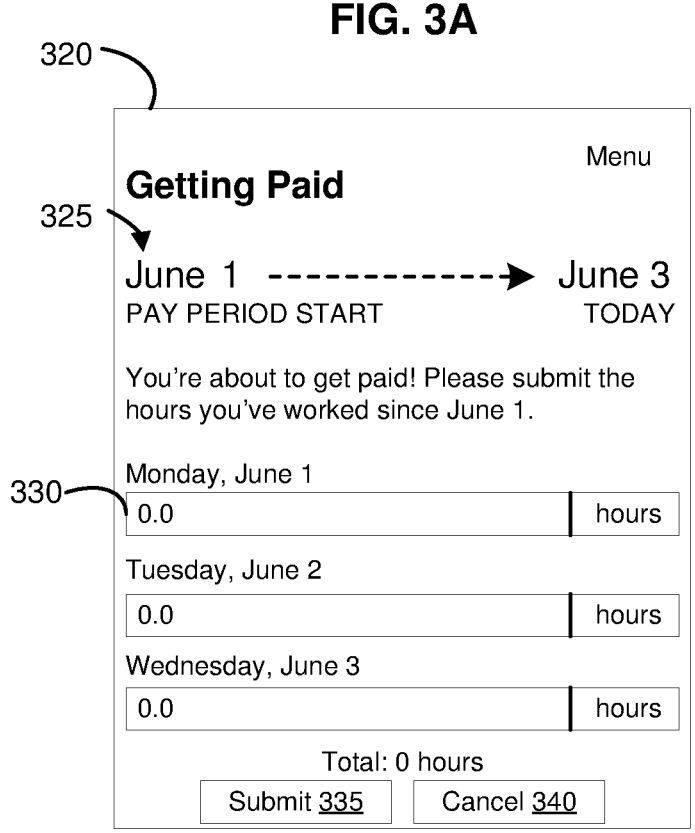

FIG. 3B illustrates an example hours input interface 320 of the flexible advance system 125. Calculations may vary for hourly and salaried employees. For example, for a salaried employee, the amount of compensation the user is eligible to receive in an instant advance will be based on the fixed compensation the employer receives each payroll. In some embodiments, the amount of compensation a user is eligible to receive is estimated based on wages received during one or more preceding pay periods. Alternatively, hourly employees may submit the number of hours worked during a pay period on an interface of the flexible advance system 125. In these embodiments, the amount of compensation an hourly employee is eligible to receive in an instant advance may be based on the number of reported hours, the pay rate for the hours (e.g., different rates for seasonal, overtime, vacation hours), and discrepancies between historical averages of reported hours and submitted hours for a current pay period. For example, if an employee worked, on average, forty hours a week over the last four pay periods, the total amount of compensation may be capped at forty hours. In addition, the amount of compensation a user is eligible to receive in an instant advance may vary from the amount of compensation the user is eligible to receive in a general advance using the flexible advance system 125. Amounts may vary based on local and state laws, a balance of the entity account, time of request (e.g., on a weekday, weekend, holiday, etc.), or the like.

The example hours input interface 320 shown includes pay period information 325 and interface elements to input hours (input element 330), submit hours, (submit element 335), and cancel requests, (cancel element 340). Pay period information 325 includes information about the pay period the instant advance request is associated with. For example, the start and end dates of the pay period, current date, processing dates, expected advance delivery dates, and the like. Users input the number of hours worked during the interval in input elements, e.g., input element 330. The number of days for which a user can input hours corresponds to the number of days in the interval. Users submit hours through the submit element 335. Users may cancel an advance request using the cancel element 340. Other example interfaces may include elements that allow users to return to a previous webpage, return to a main menu, and the like.

Figure 3C:
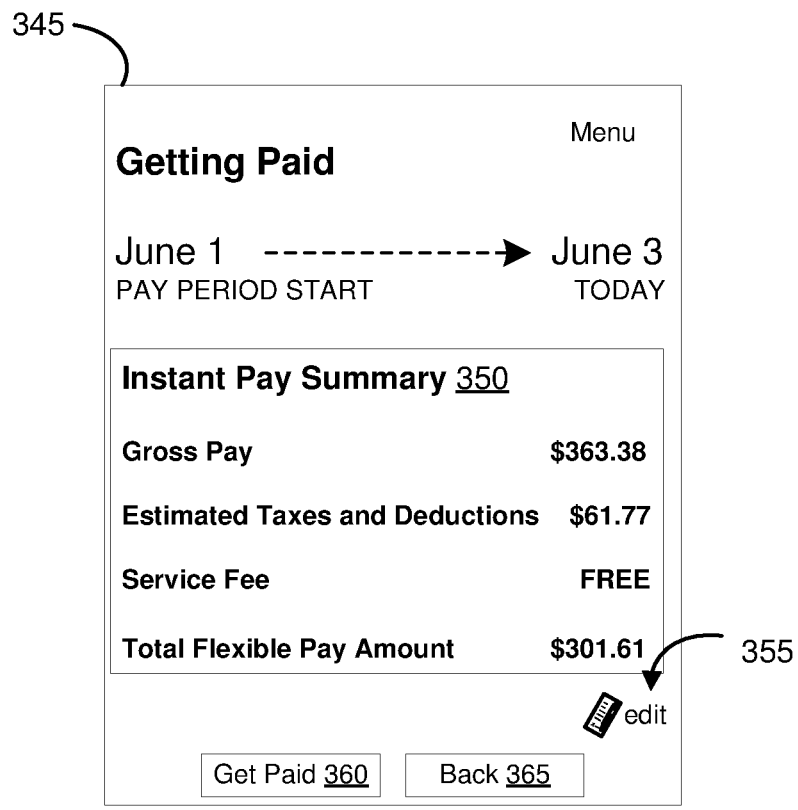

FIG. 3C illustrates an example instant advance summary interface 345 of a flexible advance system 125. In some embodiments, hourly employees may be directed to the instant advance summary interface 345 after they submit hours in the hours input interface 320. Salaried workers may be directed to the advance summary interface 345 directly after initiating an advance request on the instant advance interface 305.

Based on the number of hours submitted and/or compensation estimates based on compensation received from one or more preceding pay periods, any special attributes (holiday, overtime, vacation), and information in the employee store 210, employer store 215, and/or eligibility store 220, the flexible advance system 125 calculates the amount of compensation the user is eligible to receive. The amount of compensation the user is eligible to receive may be subject to general usage rules and/or user-specific usage rules. For example, a user may only be allowed to report a number of hours corresponding to a maximum number of hours worked over a period. The amount of compensation the user is eligible to receive may further be based on any liabilities, benefits, deductions, etc., of the user. Further, the amount of compensation a user is eligible to receive in an instant advance may be based on the amount of funding available in the entity account of the third-party entity 115 at the time of the request, estimated adoption rates for the period, utilization rates for the period, time of the request, or the like.

The gross and net income associated with uncompensated time in the time interval are provided to the user in the instant advance summary interface 345. In the example embodiment shown, the instant advance summary interface 345 includes a flexible pay summary 350 and interface elements that allow the user to interact with and navigate the various interfaces of the flexible advance system 125. The flexible pay summary 350 summarizes the amount of compensation a user will receive in the instant advance request. Information may include gross pay, estimated taxes and deductions, service fees, and net pay (shown as total flexible pay amount). Examples of service fees may be calculated as flat fees and/or interest rates. For example, there may be a flat fee for processing the advance request and an interest rate based on the value of the advance (e.g., 1% of the received advance or $3 for each transaction, etc.).

The flexible pay summary 350 may provide the user with a maximum net amount the user can receive, a recommended net amount, or a net minimum amount. For example, a user may be able to take out a maximum of $1000, but based on the history of the user, the flexible advance system 125 recommends that the user only take out a portion of the maximum. The minimum amount may correspond to a minimum amount of compensation a user must receive to complete the transaction. For example, a user may have to receive a minimum of $75 for an advance request to be valid. In some embodiments, the flexible pay summary 350 may also include information explaining how the values in the flexible pay summary 350 were calculated. For example, how liabilities and deductions are factored into the net amount paid, what is a service fee, why there are discrepancies between the number of reported hours and the number of hours eligible to be compensated, and the like.

Users can edit the amount they receive in the advance using the edit element 355. In some embodiments, the user may be constrained to choose a value within a range. For example, users may not request more than the amount the flexible advance system 125 calculates as the maximum (e.g., less than 75% of their expected salary in an upcoming payroll). Similarly, a user may have to request at least a threshold amount (e.g., $75). Users may also be able to edit amounts withheld for taxes, deductions, benefits, and the like. For example, a user may be aware of a retirement cap that was reached for an account in a previous payroll and needs to reduce the amount of money allocated to that account in future payrolls. Users confirm the submission of the advance request through an element of the instant advance summary interface 345, e.g., get paid element 360. Users may return to a previous interface, cancel the request, return to a homepage, and the like through additional elements of the advance summary interface, e.g., back element 365.

Figure 3D:
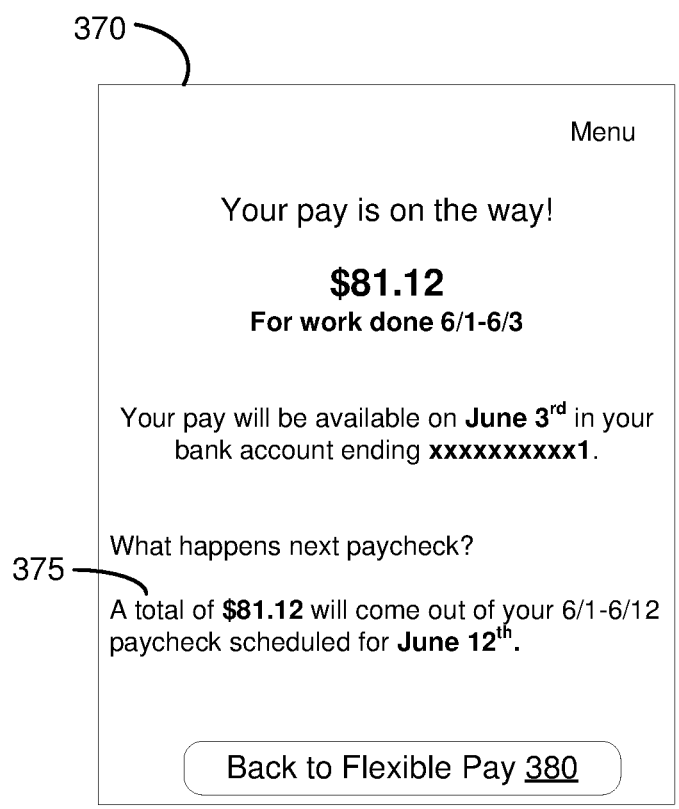

FIG. 3D illustrates an example receipt interface 370 of the flexible advance system 125. The receipt interface 370 shown is an example interface that may be presented to the user after an instant advance request is submitted. Information provided to the user in the receipt interface 370 may include the amount of compensation associated with the instant advance, when it will be available, the account it will be deposited into, and the like. The receipt interface 370 may also include recoupment information 375. Recoupment information 375 may include information explaining the amount that is owed and when it is owed. Information may further include when the user is eligible to initiate an additional request, if the user is eligible to request future advances, account balances, etc. Through elements of the receipt interface 370, e.g., element 380, the user may be redirected to a homepage interface or profile interface that allows the user to view summaries of past transactions, the user's profile, eligibility, and the like.

Once the flexible advance system 125 receives and approves instant advance requests, the flexible advance system 125 generates advance instructions that include the amount of funds to transfer to the user accounts of the requesting users. The flexible advance system 125 provides the advance instructions to the third-party entity 115. Based on the advance instructions, the third-party entity 115 transfers funds to user accounts in accordance with the advance amounts in the advance instructions. In some embodiments, the flexible advance system 125 generates and provides advance instructions immediately after receiving and approving advance requests. In other embodiments, the flexible advance system 125 generates and provides advance instructions at predetermined intervals, such as every minute, every 10 minutes, every hour, every day, or the like. Similarly, the advance instructions may instruct the third-party entity 115 when to execute advance instructions. For example, the flexible advance system 125 may instruct the third-party entity 115 to distribute instant advances immediately upon receiving advance instructions or at some predetermined interval (e.g., every minute, 10 minutes, hour, day, etc.).

Figure 4:
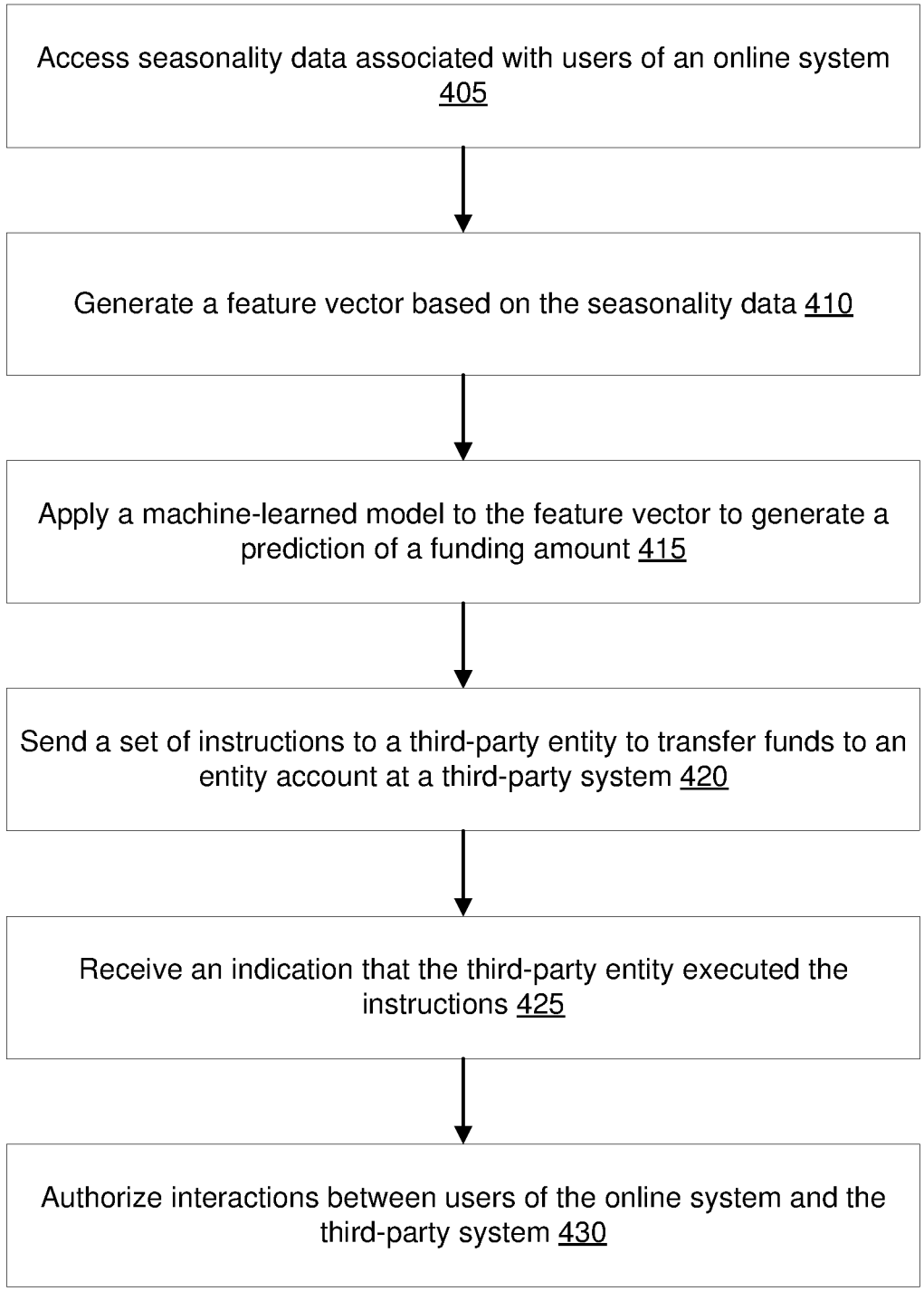
FIG. 4 is a flow chart illustrating a method of providing instructions for instant advance requests, according to one embodiment.

FIG. 4 is a flow chart illustrating a method 400 of providing instructions for instant advance requests, according to one embodiment. An online system, such as the flexible advance system 125, accesses 405 seasonality data associated with users of the online system. The users of the online system are each associated with user accounts of a third-party system 110. Seasonality data may include, but are not limited to, pay period seasonality data, business seasonality data of the online system, month over month seasonality data, holiday seasonality.

The online system generates 410 a feature vector based in-part on the seasonality data. In some embodiments, the feature vector is further based on a target minimum balance associated with a time interval, a top-up amount, an adoption value, a buffer amount, user information (e.g., date of birth, banking data, demographic data, etc.), account signals (e.g., account balances, transaction velocity, account to spend ratios, etc.), employee status or tenure, or the like. In some embodiments, the online system may monitor utilization rates of the target minimum balance during the time interval, identify a maximum utilization rate of the target minimum balance occurring during the time interval, and update the target minimum balance for a subsequent interval based on the maximum utilization rate.

The online system applies 415 a machine-learned model to the feature vector. The machine-learned model is configured to generate a prediction of a funding amount based on the feature vector. In some embodiments, the online system determines a difference between a target minimum balance and the funding amount predicted by the machine-learned model. Responsive to determining that the difference is greater than a threshold difference, the online system may modify the funding amount such that the difference is within the threshold. Further, the online system may modify the prediction of the funding amount based on a top-up value, an adoption value and/or a buffer amount.

The online system sends 420 a set of instructions to a third-party entity 115 that includes the funding amount. The third-party entity 115 is associated with an entity account of the third-party system 110 and is configured to execute the set of instructions by transferring funds to the entity account of the third-party system 110 based on the set of instructions. The online system receives 425 an indication that the third-party entity 115 executed the set of instructions (e.g., transferred funds to the entity account of the third-party system 110 based on the prediction of the funding amount). Responsive to receiving the indication, the online system authorizes 430 interactions between users of the online system and the third-party system 110. For example, the online system may authorize users to request instant advances. In addition, the one system may modify an amount a user can request in an advance request, the number of advances a user can request in a given time interval, and the like.

In some embodiments, the online system receives an indication of a remaining balance of the transferred funds at the end of a first time interval associated with the funding amount. For example, the remaining balance of transferred funds may be an amount of remaining funds in the entity account at the end of the first time interval. In these embodiments, the online system may generate a second feature vector based on the seasonality data and apply the second feature vector to the machine-learned model to generate a second funding amount for a second time interval that is subsequent to the first time interval. In an embodiment, the online system determines a difference between the remaining balance and the second prediction of the second funding amount for the second time interval. In response to determining that the difference is greater than a threshold difference, the online system may modify the prediction of the second funding amount such that the difference is less than the threshold difference.

Figure 5:
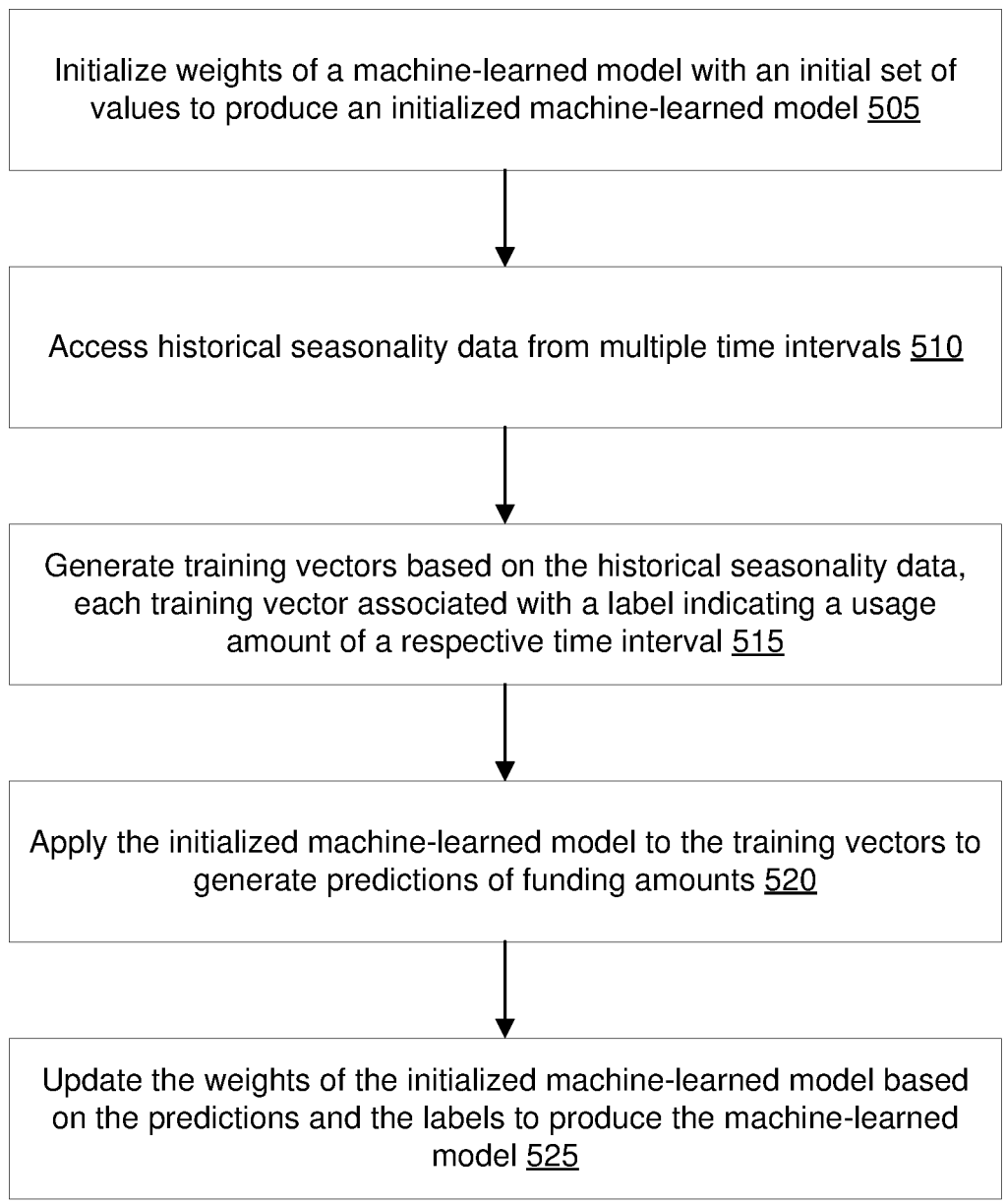
FIG. 5 is a flow chart illustrating a method of training a machine-learned model for predicting funding amounts, according to one embodiment.

FIG. 5 is a flow chart illustrating a method 500 of training a machine-learned model for predicting funding amounts, according to one embodiment. The online system initializes 505 weights of the machined-learned model with an initial set of values to produce an initialized machine-learned model. The online system accesses 510 historical seasonality data from multiple time intervals. The online system generates 515 training vectors based on the historical seasonality data. Each training vector is associated with a time interval and a label indicating a usage amount of a respective time interval. The online system applies 520 the initialized machine-learned model to the training vectors to generate predictions of funding amounts. The online system updates 525 the weights of the initialized machine-learned model based on the predictions and the label associated with each of the training vectors to produce the machine-learned model. The online system may update the weights of the initialized machine-learned model until a difference between the predictions and the label associated with each of the training vectors is within a threshold difference.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
 training, by an online system, a machine-learned model by:
  initializing weights of the machine-learned model with an initial set of values to produce an initialized machine-learned model;
  accessing historical seasonality data from a plurality of time intervals;
  generating a plurality of training vectors based on the historical seasonality data, wherein each of the plurality of training vectors is associated with a time interval of the plurality of time intervals, and wherein each respective training vector is associated with a label indicating a usage amount of a respective time interval;
  for each of the plurality of training vectors, applying the initialized machine-learned model to the training vector to generate a prediction of a funding amount for the respective time interval based on the respective training vector; and
  updating the weights of the initialized machine-learned model based on the predictions and the label associated with each of the training vectors to produce the machine-learned model;
 accessing, by an online system, seasonality data associated with users of the online system, wherein users of the online system are associated with user accounts of a third-party system;
 generating, by the online system, a feature vector based, in part, on the seasonality data and on a target minimum balance associated with a first time interval;
 applying a machine-learned model to the feature vector to predict, a funding amount based on the feature vector;

sending a set of instructions including the prediction of the funding amount to a third-party entity, wherein the third-party entity is associated with an entity account of the third-party system and is configured to execute the set of instructions by transferring funds to the entity account of the third-party system based on the set of instructions;

receiving an indication that the third-party entity executed the set of funding instructions;

responsive to receiving the indication, authorizing, by the online system, interactions by users of the online system with the third-party system; and updating the target minimum balance for a second time interval based on a maximum utilization rate of transferred funds during the first time interval.

2. The computer-implemented method of claim 1, further comprising:

determining a difference between the target minimum balance and the funding amount;

responsive to determining that the difference is greater than a threshold difference, modifying the funding amount such that the difference is within the threshold difference; and updating the set of instructions based on the modified funding amount.

3. The computer-implemented method of claim 1, wherein the funding amount is associated with a first time interval, the method further comprising:

receiving an indication of a remaining balance of the transferred funds at an end of the first time interval;

generating, by the online system, a second feature vector based on the seasonality data;

applying the machine-learned model to the second feature vector to generate a second prediction of a second funding amount for a second time interval, the second time interval being subsequent to the first time interval;

determining a difference between the remaining balance and the second prediction of the second funding amount for the second time interval; and responsive to determining that the difference is greater than a threshold difference, modifying the second prediction of the funding amount such that the difference is less than the threshold difference.

4. The computer-implemented method of claim 1, wherein the feature vector includes at a set of numerical values, wherein at least a first one of the numerical values represents an adoption value, and wherein at least a second one of the numerical values represents a buffer amount.

5. A non-transitory computer-readable storage medium containing computer program code that, when executed by a hardware processor, causes the hardware processor to perform steps comprising:

training, by an online system, a machine-learned model by:

initializing weights of the machine-learned model with an initial set of values to produce an initialized machine-learned model;

accessing historical seasonality data from a plurality of time intervals;

generating a plurality of training vectors based on the historical seasonality data, wherein each of the plurality of training vectors is associated with a time interval of the plurality of time intervals, and wherein each respective training vector is associated with a label indicating a usage amount of a respective time interval;

for each of the plurality of training vectors, applying the initialized machine-learned model to the training vector to generate a prediction of a funding amount for the respective time interval based on the respective training vector; and updating the weights of the initialized machine-learned model based on the predictions and the label associated with each of the training vectors to produce the machine-learned model;

accessing, by an online system, seasonality data associated with users of the online system, wherein users of the online system are associated with user accounts of a third-party system;

generating, by the online system, a feature vector based, in part, on the seasonality data and on a target minimum balance associated with a first time interval;

applying a machine-learned model to the feature vector to predict a funding amount based on the feature vector;

sending a set of instructions including the prediction of the funding amount to a third-party entity, wherein the third-party entity is associated with an entity account of the third-party system and is configured to execute the set of instructions by transferring funds to the entity account of the third-party system based on the set of instructions;

receiving an indication that the third-party entity executed the set of funding instructions;

responsive to receiving the indication, authorizing, by the online system, interactions by users of the online system with the third-party system; and updating the target minimum balance for a second time interval based on a maximum utilization rate of transferred funds during the first time interval.

6. The non-transitory computer-readable storage medium of claim 5, further comprising code that, when executed by the hardware processor, cause the hardware processor to perform steps comprising:

determining a difference between the target minimum balance and the funding amount;

responsive to determining that the difference is greater than a threshold difference, modifying the funding amount such that the difference is within the threshold difference; and updating the set of instructions based on the modified funding amount.

7. The non-transitory computer-readable storage medium of claim 5, wherein the funding amount is associated with a first time interval, and further comprising code that, when executed by the hardware processor cause the hardware process to perform steps comprising:

receiving an indication of a remaining balance of the transferred funds at an end of the first time interval;

generating, by the online system, a second feature vector based on the seasonality data;

applying the machine-learned model to the second feature vector to generate a second prediction of a second funding amount for a second time interval, the second time interval being subsequent to the first time interval;

determining a difference between the remaining balance and the second prediction of the second funding amount for the second time interval; and responsive to determining that the difference is greater than a threshold difference, modifying the second prediction of the funding amount such that the difference is less than the threshold difference.

8. The non-transitory computer-readable storage medium of claim 5, wherein the feature vector includes at a set of numerical values, wherein at least a first one of the numerical values represents an adoption value, and wherein at least a second one of the numerical values represents a buffer amount.

9. A system comprising:
a hardware processor; and
a non-transitory computer-readable medium containing instructions that, when executed by the hardware processor, cause the hardware processor to:
train, by an online system, a machine-learned model by:
initializing weights of the machine-learned model with an initial set of values to produce an initialized machine-learned model;
accessing historical seasonality data from a plurality of time intervals;
generating a plurality of training vectors based on the historical seasonality data, wherein each of the plurality of training vectors is associated with a time interval of the plurality of time intervals, and wherein each respective training vector is associated with a label indicating a usage amount of a respective time interval;
for each of the plurality of training vectors, applying the initialized machine-learned model to the training vector to generate a prediction of a funding amount for the respective time interval based on the respective training vector; and
updating the weights of the initialized machine-learned model based on the predictions and the label associated with each of the training vectors to produce the machine-learned model;
access, by an online system, seasonality data associated with users of the online system, wherein users of the online system are associated with user accounts of a third-party system;
generate, by the online system, a feature vector based, in part, on the seasonality data and on a target minimum balance associated with a first time interval;
apply a machine-learned model to the feature vector to predict a funding amount based on the feature vector;
send a set of instructions including the prediction of the funding amount to a third-party entity, wherein the third-party entity is associated with an entity account of the third-party system and is configured to execute the set of instructions by transferring funds to the entity account of the third-party system based on the set of instructions;
receive an indication that the third-party entity executed the set of funding instructions;
responsive to receiving the indication, authorize, by the online system, interactions by users of the online system with the third-party system; and
update the target minimum balance for a second time interval based on a maximum utilization rate of transferred funds during the first time interval.

10. The system of claim 9, further containing instructions that cause the hardware processor to:
determine a difference between the target minimum balance and the funding amount;
responsive to determining that the difference is greater than a threshold difference, modify the funding amount such that the difference is within the threshold difference; and
updating the set of instructions based on the modified funding amount.

11. The system of claim 9, wherein the funding amount is associated with a first time interval, the system further containing instructions that cause the hardware processor to:
receive an indication of a remaining balance of the transferred funds at an end of the first time interval;
generate, by the online system, a second feature vector based on the seasonality data;
apply the machine-learned model to the second feature vector to generate a second prediction of a second funding amount for a second time interval, the second time interval being subsequent to the first time interval;
determine a difference between the remaining balance and the second prediction of the second funding amount for the second time interval; and
responsive to determining that the difference is greater than a threshold difference, modify the prediction of the second funding amount such that the difference is less than the threshold difference.

* * * * *